Oct. 6, 1931.   B. MARTIN   1,825,807
VALVE
Filed Dec. 21, 1929

Inventor
BRUNO MARTIN.
By E. K. Bond
Attorney

Patented Oct. 6, 1931

1,825,807

UNITED STATES PATENT OFFICE

BRUNO MARTIN, OF SAGINAW, MICHIGAN

VALVE

Application filed December 21, 1929. Serial No. 415,751.

This invention relates to valves and particularly to a valve of the needle type by use of which flow of air, water, steam or other fluids may be controlled.

One object of the invention is to provide a valve through which fluid may flow at high pressure and at the same time be held under control and easily shut off when necessary.

Another object of the invention is to provide the valve with a fluid passage which may be easily cleaned if it should become clogged.

Another object of the invention is to so form the valve that it may be cheaply produced for any diameter of piping and will be of a very strong construction.

Other objects of the invention will hereinafter appear and the novel features will be specifically defined by the appended claims.

The invention is illustrated in the accompanying drawings wherein.

Figure 1:
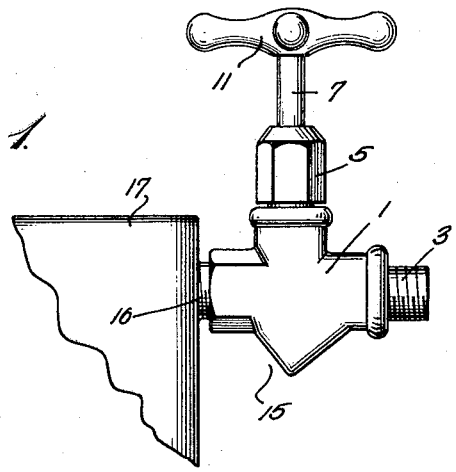
Fig. 1 is a view showing the improved valve in side elevation.
Figure 2:
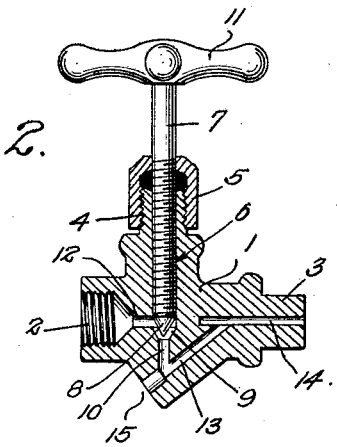
Fig. 2 is a longitudinal sectional view through the valve.

This valve consists of a body 1 formed as a single casting and having its rear or inner end formed with a threaded socket 2 and its outer or front end reduced and threaded to form a neck 3 for engagement with a pipe or nozzle, but it is to be understood that both ends of the body may be of similar construction if so desired. A neck 4, threaded to carry a packing gland 5, rises from the body and axially of this neck is formed a threaded bore 6 in which is received a threaded stem 7 having a tapered lower end 8 adapted to seat within the conical valve seat 9 formed at the junction of the bore with the upper end of the fluid passage 10 and close the passage when the stem is rotated in a closing direction by grasping and turning the handle 11. A fluid passage 12 leads from the inner end of the socket 2 and communicates with the bore 6 immediately above the valve seat 9 and at its lower end the passage 10 opens into a passage 13 extending forwardly through the body at an upward incline and communicating with a discharge passage 14. The rear end of the passage 13 is closed by a plug 15 threaded into place so that it can be removed when it is necessary to clean the valve.

When this valve is in use it is screwed into engagement with a pipe or an outlet 16 of a reservoir 17 as shown in Fig. 1 and upon turning the stem 7 in an opening direction the tapered inner end thereof moves away from its seat 9 so that fluid may pass through the valve by way of the passages 12, 10, 13 and 14. Since the passages 12 and 14 are out of direct communication with each other, likelihood of a leak developing is reduced to a minimum but at the same time a very good flow of fluid under high pressure is permitted when the valve is opened. If the passages become clogged the plug 15 is removed and also the stem if found necessary, and a wire or similar cleaning implement can be easily forced through the passages to thoroughly clean the same. It will thus be seen that this improved valve is of a simple construction, very efficient in its operation and easily cleaned when necessary.

The terms and expressions which I have employed are used as terms of description and not of limitation, and I have no intention, in the use of such terms and expressions, of excluding any equivalents of the features shown and described, or portions thereof, but recognize that various modifications are possible within the scope of the invention claimed.

What is claimed is:

1. A valve comprising a body having aligned fluid passages leading from its front and rear ends and terminating in spaced relation to each other, said body having a neck intermediate its ends and axially of the neck being formed with a threaded bore communicating with the inner end of the rear passage and having its inner portion formed with a tapered valve seat and a reduced passage leading therefrom, a connecting passage being formed longitudinally in said body at an incline to the reduced passage and communicating therewith intermediate its ends and having its front end opening into the front passage and its rear end opening through the rear portion of the body, a removable plug closing the rear end of the connecting passage, and a stem threaded through said bore and having its inner end tapered to seat against said valve seat when closed.

2. A valve comprising a body formed with a threaded bore having a portion shaped to define a valve seat and a passage leading therefrom axially of the bore, said body having aligned passages leading inwardly from its ends and one communicating with said bore above said seat and the other terminating in spaced relation to the bore, the lower portion of said body having a diagonally extending connecting passage formed therein open at its outer end and extending in intersecting relation to the lower end of the said first passage and opening into the inner end portion of the passage spaced from the bore, a removable closure plug for the outer end of said connecting passage, and a threaded stem engaged in said bore and adapted to seat against the valve seat.

3. A valve comprising a body formed with a threaded bore having a portion shaped to define a valve seat and a passage leading from the inner end thereof, a stem threaded through said bore and having its inner end adapted to seat against said valve seat when the stem is screwed inwardly to a closed position, said body having aligned passages leading from its ends and one opening into said bore close to said seat, and a passage connecting the inner end portion of the passage leading from the other end of the valve with the lower end of the first passage.

4. A valve comprising a body, formed with a passage opening through its ends said passage having end portions disposed substantially in alignment and intermediate portions extending transversely and diagonally of the end portions and connecting the same, said body having a threaded bore formed therein and at the inner end of the bore formed with a valve seat disposed between said aligned end portions of the passage, and a valve stem threaded through said bore and adapted to seat against said valve seat to close said passage.

5. A valve comprising a body formed with a passage opening through its ends said passage having its intermediate portion out of alignment with its end portions, said body having a threaded bore formed with a valve seat at its inner end intersecting said passage, and a valve stem threaded through said bore and adapted to seat against said seat to close said passage.

6. A valve comprising a body formed with a passage opening through its ends said passage having its intermediate portion out of alignment with its end portions, said body having a threaded bore formed with a valve seat at its inner end intersecting said passage at the intersection of its intermediate portion and one end portion thereof, and a valve stem threaded through said bore and adapted to seat against said seat to close the passage.

In testimony whereof I affix my signature.

BRUNO MARTIN.